United States Patent Office 3,071,631
Patented Jan. 1, 1963

3,071,631
SYNTHESIS OF DIARYLALKANES
Harald J. Drews, Gary, Ind., and Ellis K. Fields, Chicago, Ill., assignors to Standard Oil Company, Chicago, Ill., a corporation of Indiana
No Drawing. Filed June 26, 1961, Ser. No. 119,307
6 Claims. (Cl. 260—668)

This invention relates to the synthesis of organic chemical compounds. More particularly, it relates to the pyrolytic rearrangement of aromatic sulfones to diaryl alkanes.

Aromatic sulfones are considered thermally stable. For example, diphenyl sulfone may be distilled at 380° C., and di-p-tolyl-sulfone at 450° C. without decomposition. We have discovered, however, that certain aromatic sulfones are thermally unstable and when heated at elevated temperatures these sulfones decompose and rearrange to diaryl alkanes.

It has been found in accordance with the present invention that certain aromatic sulfones having the structural formula aryl-$SO_2$-aryl wherein at least one aryl group is substituted at a position ortho to the S—C linkage with an alkyl radical having at least one hydrogen alpha to the ring carbon are rearranged with the elimination of sulfur dioxide to diaryl alkanes. At least one aryl radical of the aromatic sulfone must be substituted with an alkyl group in the ortho-position to the sulfonyl group. A further requisite for pyrolytic rearrangement of the ortho substituted aromatic sulfones is that the alpha carbon of the ortho alkyl group have at least one hydrogen atom attached thereto.

While the exact mechanism of the pyrolytic rearrangement is not understood, we believe that it may involve a migration of the hydrogen atom on the alpha carbon of the alkyl substituent ortho to the sulfonyl group thereby producing a carbanion, followed by internal rearrangement of the intermediate carbanion to eliminate sulfur dioxide with concurrent coupling of the alpha carbon with the other aromatic nucleus.

In accordance with the present invention the ortho substituted aromatic sulfone is heated alone or in the presence of an inert solvent at elevated temperatures sufficient to evolve sulfur dioxide and heating continued until the evolution of the sulfur dioxide ceases. The specific temperature employed and time to effect substantially complete conversion to diaryl alkane is dependent upon the specific chemical composition of the sulfone including the nature of the other substituents thereon. In general, the sulfones which are more highly substituted on the aromatic nucleus require a lower temperature of pyrolysis. We have found that temperatures of from about 300° C. to about 600° C. are satisfactory for effecting the pyrolytic rearrangement of the aromatic sulfones of this invention. Lower temperatures are preferred so as to minimize the production of thermal degradation products. The removal of the sulfur dioxide that is produced is advantageously effected by sweeping the reactants and reaction vessel with an inert gas such as nitrogen.

The following examples are set forth for the purpose of illustrating the present invention without limiting the same.

Example I

A three-neck round-bottom flask equipped with a thermometer, a short gas inlet tube and condenser was charged with 22 g. of 2,5,2′,5′-tetramethyl diphenyl sulfone and heated over a period of 29 hours at a temperature of 380–400° C. Nitrogen was passed through the flask to flush out sulfur dioxide formed during the reaction. The sulfur dioxide was absorbed in a caustic scrubber and titrated at intervals in determining the rate of conversion. When no more sulfur dioxide was formed the reaction was complete. The crude reaction mixture was extracted with ether and the insoluble part dried, with recovery of 8.5 g. of starting material. The ether extract was dried with sodium sulfate, solvent evaporated and the product distilled. A colorless liquid was obtained, B.P. 106° C. (0.5–1 mm. Hg pressure) yield: 5 g.; 26 mol percent. Analysis for $C_{16}H_{18}$ (molecular weight 210.32) calc.: C, 91.37; H, 8.63; found: C, 91.12; H, 8.53. 4 g. of residue remained from the distillation.

The pyrolysis product of this example was compared with 2,5,4′-trimethyldiphenylmethane prepared by a conventional chemical reaction of alpha-chloro-p-xylene and p-xylene in the presence of $FeCl_3$. Boiling points, infra red spectra and refractive indices of both materials were identical.

Example II

Following the procedure of Example I, 25 g. of 2-methyldiphenyl sulfone was heated over a period of 8 hours at 395–410°. Some colorless liquid distilled over. The crude reaction product was extracted with ether, the distillate added to the extract and the solution treated with charcoal. Fractionation of the product gave 8 g. of a low-boiling liquid that condensed in the cold-trap. Gas chromatography showed it was a mixture of 18.8% benzene and 81.2% toluene. 3.5 g. of a high-boiling turbid liquid, B.P. 103° (6 mm. Hg pressure), was obtained, yield 20 mole percent. The IR-spectra of this produce and of authentic diphenylmethane were identical.

Example III

Similarly, 20 g. of 2,4,2′,4′-tetramethyl diphenyl sulfone was pyrolyzed at a temperature of 350–360° C. over a period of 30.5 hours. Yield: 6.2 g. of 2,4,3′-trimethyl diphenyl methane, B.P. 106° C. (0.5–1 mm. Hg pressure), 40 mole percent. Analysis for $C_{16}H_{18}$ (molecular weight 210.32) calc.: C, 91.37; H, 8.63; found: C, 91.37; H, 8.45.

Example IV

Pyrolysis of 20 g. of di-mesityl sulfone, M.P. 204°, was performed over a period of 20 hours at 375–400°. The crude reaction mixture was dissolved in ether, stirred with a small amount of charcoal, filtered and ether evaporated. The residue was 15 g. of a solid melting at 58–60° C. A sample recrystallized from alcohol melted at M.P. 65° C. Reported melting point for 2,4,6,3′,5′-pentamethyldiphenyl methane is 67° C. Starting material was not recovered in this run. The yield of pentamethyldiphenylmethane was 95%.

A sample of 2,4,6,3′,5′-pentamethyldiphenyl methane was prepared by a conventional chemical reaction as follows: 42 g. of alpha-bromomesitylene was dissolved in 50 ml. mesitylene and this solution slowly dropped over a period of one hour, under fast stirring, into a slurry of 8 g. anhydrous ferric chloride and 200 ml. mesitylene. The reaction temperature was kept at 50° C. After all mesitylene bromide was added, the reaction mixture was stirred for an additional hour at 80° C. The crude reaction product was poured on crushed ice, extracted with ether, dried and fractionated. There was a forecut of 12 g. (B.P. 65° C./1 mm. Hg pressure), the heartcut distilled over at 134° C./1 mm. Hg pressure and solidified soon; M.P. of the distillate was 59–61° C.; yield 26 g. (62 mole percent). The distillate was recrystallized from alcohol; yield: 17 g.; M.P. 67° C.

A mixed melting point of this product with the pyrolysis product obtained by this example did not show any depression, both compounds are identical.

Example V

Pyrolysis of 4,4′-ditolylsulfone and 3,4,4′,4′-tetramethyldiphenylsulfone, neither of which has an alkyl substituent ortho to the S—C linkage, was effected under similar conditions, in each case at 400° C. for 18 hours and only traces of unidentified hydrocarbons were obtained.

Example VI

Ortho-alkyldiaryl sulfones having from 2–18 carbon atoms in the alkyl group can similarly be pyrolyzed and rearranged to diaryl alkanes. For example when 2-ethyldiphenyl sulfone, 2-isopropyldiphenyl sulfone, 2-dodecyldiphenyl sulfone, 2-methylnaphthylphenyl sulfone, 2-methyldinaphthyl sulfone, and 2-octadecyldiphenyl sulfone are heated at temperatures above 350° C. sulfur dioxide is eliminated and diaryl alkanes having the structure

wherein

is the ortho-alkyl residue, are formed.

The above examples illustrate that pyrolysis of ortho-alkylated diaryl sulfones furnishes a new route for the synthesis of diaryl alkanes. The requirement that at least one of the aromatic nuclei of the aromatic sulfones contain an ortho-alkyl group is shown in Example V wherein the attempted pyrolytic conversion of para, and meta-, para-alkyl substituted diphenyl sulfones to diaryl alkanes was unsuccessful.

We claim:

1. A process for preparation of a diaryl alkylidene compound which comprises: heating a sulfone having the structural formula aryl-SO$_2$-aryl wherein at least one aryl group is substituted at the position ortho to the S—C linkage with an alkyl radical having at least one hydrogen atom alpha to the ring carbon; effecting said heating at an elevated temperature sufficient to pyrolyze said sulfone with the formation of sulfur dioxide; and separating a diaryl alkylidene having the formula

wherein the group

is derived from said alkyl radical, and R and R' each represent a member of the group consisting of alkyl radical and hydrogen.

2. A process for preparation of a diphenyl alkylidene compound which comprises: heating a sulfone having the basic structural formula

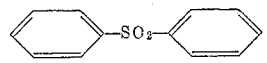

wherein at least one phenyl group is substituted at the position ortho to the S—C linkage with an alkyl radical having at least one hydrogen atom alpha to the ring carbon; effecting said heating at a temperature of from about 300° C. to about 600° C. to pyrolyze said sulfone with the formation of sulfur dioxide; and separating a diphenyl alkylidene having the formula

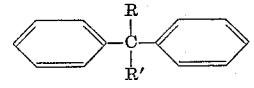

wherein the group

is derived from said alkyl radical.

3. A process for preparation of diphenyl methane which comprises: heating 2-methyldiphenyl sulfone at a temperature of from about 300° C. to about 600° C. to pyrolyze said sulfone with the formation of sulfur dioxide; and separating said diphenyl methane.

4. A process for the preparation of 2,5,4'-trimethyldiphenyl methane which comprises: heating 2,5,2',5'-tetramethyldiphenyl sulfone at a temperature of from about 300° C. to about 600° C. to pyrolyze said sulfone with the formation of sulfur dioxide; and separating said diphenyl methane.

5. A process for the preparation of 2,4,6,3',5'-pentamethyldiphenyl methane which comprises: heating dimesityl sulfone at a temperature of from about 300° C. to about 600° C. to pyrolyze said sulfone with the formation of sulfur dioxide; and separating said diphenyl methane.

6. A process for the preparation of 2,4,3'-trimethyldiphenyl methane which comprises: heating 2,4,2',4'-tetramethyldiphenyl sulfone at a temperature from about 300° C. to about 600° C. to pyrolyze said sulfone with the formation of sulfur dioxide; and separating said diphenyl methane.

No references cited.